(12) United States Patent
Nagai et al.

(10) Patent No.: US 7,273,504 B2
(45) Date of Patent: Sep. 25, 2007

(54) BATTERY AND A METHOD OF MANUFACTURING SAME

(75) Inventors: Tatsuya Nagai, Hyogo (JP); Masanori Asano, Gunma (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 454 days.

(21) Appl. No.: 10/392,904

(22) Filed: Mar. 21, 2003

(65) Prior Publication Data

US 2003/0194606 A1    Oct. 16, 2003

(30) Foreign Application Priority Data

Mar. 27, 2002  (JP) ............... 2002-089308
Dec. 17, 2002  (JP) ............... 2002-365387

(51) Int. Cl.
  *H01M 4/82*  (2006.01)
  *H01M 6/00*  (2006.01)
  *H01M 2/08*  (2006.01)
  *H01M 2/02*  (2006.01)

(52) U.S. Cl. .................. 29/623.5; 429/175; 429/177

(58) Field of Classification Search .............. None
See application file for complete search history.

(56) References Cited

U.S. PATENT DOCUMENTS

| 3,973,995 | A | * | 8/1976 | Kamai ............... 429/173 |
| 4,022,861 | A | * | 5/1977 | Levesque ........... 264/116 |
| 4,801,514 | A | * | 1/1989 | Will et al. .......... 429/167 |
| 5,368,953 | A | * | 11/1994 | Zaborney et al. .... 429/90 |

FOREIGN PATENT DOCUMENTS

| JP | S38-8669 | 6/1963 |
| JP | S50-4655 | 2/1975 |
| JP | S51-136142 | 11/1976 |
| JP | 9-237616 | * 9/1997 |
| JP | 3218820 | 8/2001 |

* cited by examiner

*Primary Examiner*—Stephen Kalafut
*Assistant Examiner*—Julian Mercado
(74) *Attorney, Agent, or Firm*—Kratz, Quintos & Hanson, LLP

(57) ABSTRACT

A battery having a single cell, an outer paper package covering the single cell, and a water-repellent layer included in the outer paper package.

4 Claims, 4 Drawing Sheets

BATTERY AND A METHOD OF MANUFACTURING SAME

CROSS-REFERENCE TO RELATED APPLICATION

This application claims priorities from Japanese Patent Application Nos. 2002-89308 and 2002-365387 which are incorporated herein by reference.

BACKGROUND OF THE INVENTION

1. Field of the Invention

The invention relates to a battery and a method of manufacturing the battery.

2. Description of the Related Art

Recently, as a power source for various portable devices, a group-battery comprising a plurality of alkaline storage batteries or the like connected together is generally used. In this type of group-battery, each of alkaline storage batteries, that is, a single cell has its outer surface covered in an outer package of a non-expensive material such as paper or a resin film to prevent a short circuit between each other.

For example, for a group-battery for a device such as a cellular phone, which does not has a very large load, an outer package made from a resin film is used. However, a large-current group-battery used as a power source for a power tool, a power-assisted bicycle and the like has a large load, and hence, the large-current group-battery often generates heat while used. Since the thermal resistance of a resin film is limited, an outer package of paper is generally used for a large current, as shown in Japanese Patent No. 3218820 Publication.

A battery covered in an outer paper package has an advantage that if an alkaline electrolyte leaks while the battery is used, the outer paper package absorbs the electrolyte and prevents it from leaking to the outside thereof.

In the large-current group-battery, rise in temperature during the use of it should be avoided. Hence, the large-current group-battery is generally cooled with a cooling blower provided in a case containing the group-battery.

However, when cooling air is brought in by the blower, water outside such as moisture is brought into the case at the same time and reaches the single cells. In that case, since the outer paper package which covers each single cell does not have water-repellency, the water penetrates the outer paper package and reaches the battery can inside. This causes a problem such that the battery can corrodes.

An object of the invention is to solve the above problem and provide a battery in which the corrosion of a battery can due to water outside can be prevented when the battery is used in a group-battery.

SUMMARY OF THE INVENTION

The battery according to the invention comprises a single cell; an outer paper package covering said single cell; and a water-repellent layer included in said outer paper package.

The method of manufacturing a battery according to the invention comprises steps of forming a water-repellent layer on a paper sheet; and covering a single cell in said paper sheet on which the water-repellent layer is formed.

The method of manufacturing a battery according to the invention comprises steps of covering a single cell in a paper sheet; and forming a water-repellent layer on said paper sheet covering said single cell.

BRIEF DESCRIPTION OF THE DRAWINGS

The invention will become more fully understood from the detailed description given hereinbelow and the accompanying drawings which are given by way of illustration only, and thus, are not limitative of the invention, and wherein.

DETAILED DESCRIPTION OF THE INVENTION

Referring to the attached drawings, a power source for an electric screwdriver (hereinafter referred to as "power source $A_1$") according to a first embodiment of the invention will be described below.

Figure 1:
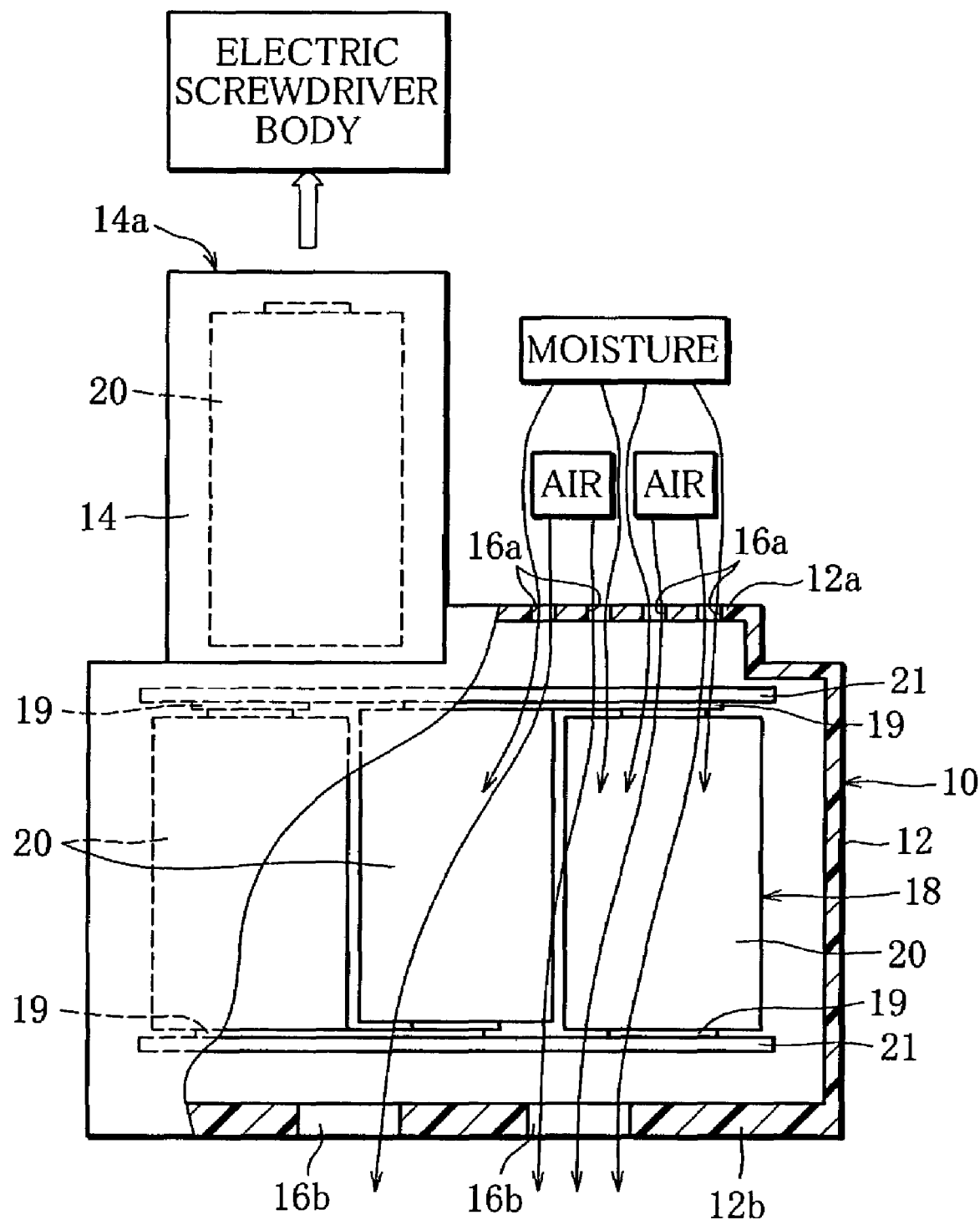
FIG. 1 is a partially-sectional side view of a power source for a power tool according to a first embodiment of the invention.

FIG. 1 shows a power source $A_1$. The power source $A_1$ has a housing 10 made of plastic. The housing 10 includes a main room 12 in the form of a rectangular solid. The top 12a and the bottom 12b of the main room 12 have a plurality of slit-like vent holes 16a, 16a, 16a, 16a and a plurality of slit-like vent holes 16b, 16b, respectively. The housing 10 also includes a sub-room 14 located on the top 12a of the main room 12. The sub-room 14 is molded integrally with the main room 12. The end part 14a of the sub-room 14 is designed to be fitted to the grip end of the body of an electric screwdriver.

The housing 10 contains a fan (not shown). By making the fan operate, air can be taken in through the vent holes 16a and emitted through the vent holes 16b, thus, made to flow through the housing 10, as indicated by arrows in FIG. 1.

The housing 10 further contains a group-battery 18 capable of supplying a large current. The group-battery 18 includes ten of alkaline storage batteries 20 which are electrically connected in series using a plurality of lead members 19. Of the ten alkaline storage batteries 20, eight are fixed in the main room 12 while the remaining two are fixed in the sub-room 14. The lead members 19 are welded to the end faces of the alkaline storage batteries 20. On each side of the alkaline storage batteries 20, the end faces of the alkaline storage batteries 20 and the lead members 19 are together covered with a buffer member 21 made of rubber.

Figure 2:
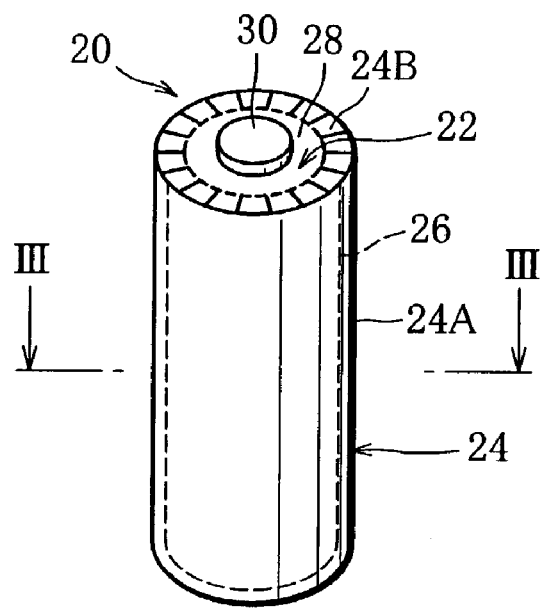
FIG. 2 is a perspective view of an alkaline storage battery included in the power source shown in FIG. 1.

As shown in FIG. 2, in each alkaline storage battery 20, a single cell 22, which is to constitute a group-battery, is covered in an outer paper package 24. Specifically, the single cell 22 includes a metal battery can 26 in the form of a bottomed cylinder whose top has an opening. The battery can 26 functions as a negative electrode terminal. In the opening of the battery can 26 is fitted a sealing plate 28 with an insulative gasket (not shown) between. The edge portion of the opening of the battery can 26 is caulked inwardly and covers the periphery of the upper face of the sealing plate 28 with the insulative gasket between. Thus, the single cell 20 has a top end formed by sealing the opening of the battery can 26 with the insulative gasket and the sealing plate 28. Around the center of the exposed upper face of the sealing plate 28 is fixed a metal positive electrode terminal 30 with a distance from the edge portion of the battery can 26.

In the sealed battery can 26, an electrode-group (not shown) comprising a negative electrode, a separator and a positive electrode is placed, and an alkaline electrolyte is put so that the electrode-group may be soaked in the alkaline electrolyte. The battery can 26 (negative electrode terminal) and the negative electrode are electrically connected, while the positive electrode terminal 30 and the positive electrode are electrically connected.

The outer paper package 24 is made from a paper sheet having a water-repellent layer. Specifically, the outer paper package 24 is made from a rectangular paper sheet, of which one side has undergone water-repellent treatment before it is used to cover the single cell 22. The outer paper package 24 includes a cylindrical part 24A which covers the cylindrical face of the battery can 26, and an end-face part 24B which covers the periphery of the top end face of the single cell 22. In more detail, the end-face part 24B covers the caulked edge portion of battery can 26 and the peripheral part of the exposed upper face of the sealing plate 28 that is in the vicinity of the caulked edge portion.

Figure 3:
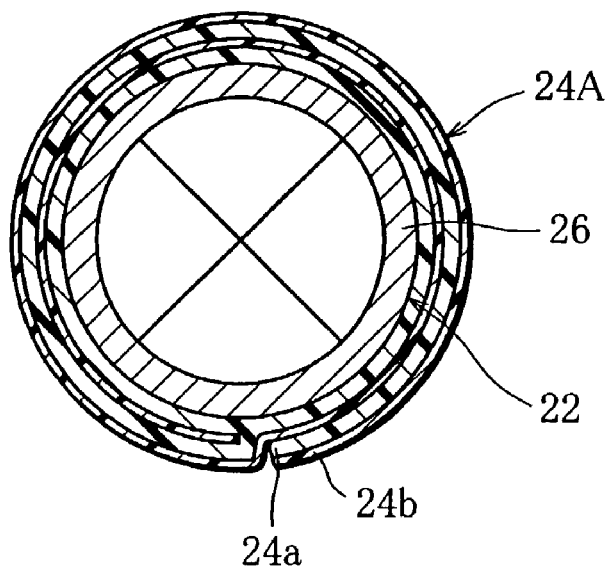
FIG. 3 is a transverse cross-sectional view of the alkaline storage battery taken along line III-III of FIG. 2.

The cylindrical part 24A is formed by wrapping a paper sheet 24a having a water-repellent layer 24b around the outer periphery of the battery can 26 for about two turns, as shown in FIG. 3. In the transverse cross-sectional view, the water-repellent layer 24b looks like a swirl. In the cylindrical part 24A as well as in the end-face part 24B, the water-repellent layer 24b is exposed to the outside of the alkaline storage battery 20. The opposite side, i.e., the rear side of the paper sheet 24a lies in contact with the battery can 26. The outer paper package 24 and the single cell 22 are fixed together using an adhesive. The layer of the adhesive is formed on the periphery of the rear side of the paper sheet 24a.

In the above-described power source $A_1$ for an electric screwdriver, even if water penetrates into the housing 10 through the vent holes 16a, 16b, the water is repelled by the water-repellent layer 24b around the alkaline storage battery 20. Thus, water does not reach the battery can 26 from the outside of the alkaline storage battery 20, and rusting of the battery can 26 is prevented effectively.

The type of the paper 24a from which the outer paper package 24 is formed is not limited to any particular ones. Electrolytic capacitor paper, pulp paper can be used. Electrolytic capacitor paper is particularly suitable because it is thin, even and dense.

The water-repellent layer 24b may be formed by applying a resin film such as a polypropylene film to the paper 24a. Alternatively, it may be formed by applying a silicone water-repellent agent, a fluorine water-repellant agent or the like onto the paper 24a and drying or curing it. It is to be noted that the water-repellant layer 24b made from a resin film is good in water-repellency but low in air permeability. Hence, if water penetrates the paper sheet 24a gradually from its edges, the water does not easily evaporate and escape through the resin film to the outside. As a result, water accumulates in the paper sheet 24a, which causes the battery can 26 to rust easily. In contrast, the water-repellant layer 24b made from a silicone water-repellent agent allows water vapor to pass through, while it repels water drops.

Hence, water does not easily accumulate in the paper sheet 24a, and the battery can 26 can be prevented from rusting for a long time. For these reasons, it is desirable that the water-repellant layer 24b is made from a silicone water-repellent agent.

Next, a method of manufacturing the above-described alkaline storage battery 20 (hereinafter referred to as "manufacturing method B") will be described.

First, paper 24a from which an outer paper package should be made is prepared and subjected to water-repellent treatment. Specifically, in a known manner, a water-repellent agent is applied onto one side of the paper 24a and then dried. As a result, a water-repellent layer 24b is formed, where the paper 24a is impregnated with a water-repellent element included in the water-repellent agent.

It is to be noted that if the paper 24a is impregnated with the applied water-repellent agent in its entire thickness, the outer paper package 24 made from that paper 24a cannot absorb an alkaline electrolyte leaking from a single cell 22. Hence, when a water-repellent agent is applied onto the paper 24a, it is desirable to make sure that the paper 234a will not be impregnated with the water-repellent agent in its entire thickness. In other words, it is desirable that the paper 24a has a water-repellent layer 24b formed on one side, while the other side of the paper 24a remains as it is and functions as an absorbing layer so as to be able to absorb an alkaline electrolyte.

Figure 4:
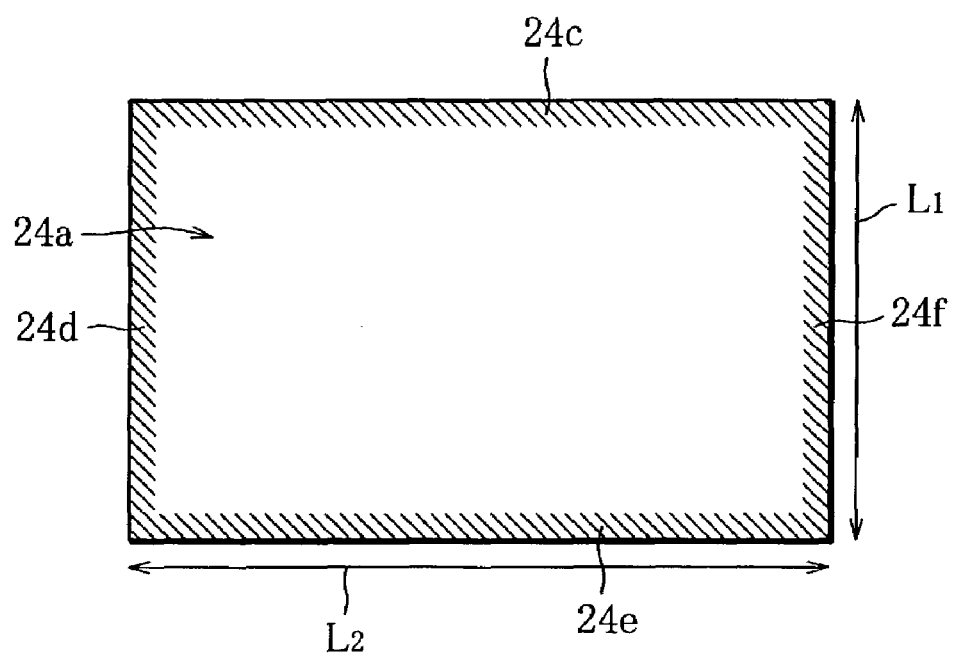
FIG. 4 shows an outer paper package used for the alkaline storage battery of FIG. 2, in a developed state.

Next, from the paper 24a which underwent the water-repellent treatment, a sheet having a belt-like shape and a predetermined size is cut, as shown in FIG. 4. Then, an adhesive is applied onto that side of the paper sheet which was not treated with the water-repellent agent, in its peripheral region marked with hatching in FIG. 4, or in other words, gluing parts 24c, 24d, 24e, 24f.

Here, the length $L_1$ of the short side of the paper sheet 24a is larger than the height of the battery can 26. Hence, when the paper sheet 24a is wrapped around the battery can 26 with its short side directed in the height direction of the battery can 26, the gluing part 24c which is intended to form a end-face part 24B extends beyond the open end of the battery can 26. The length $L_2$ of the long side of the paper sheet 24a is about twice as long as the length of the outer circumference of the battery can 26.

Next, a known single cell 22 is prepared and covered in the paper sheet 24a on which the adhesive was applied. Specifically, the single cell 22 is placed on the paper sheet 24a, on its side which was not treated with the water-repellent agent, where the short side of the paper sheet 24a is directed in the height direction of the battery can 26, and the adhesive applied on the gluing part 24d of the paper sheet 24a is brought in close contact with the battery can 26. Then, the paper sheet 24a is wrapped around the battery can 26 for one turn, with its rear side kept in contact with the cylindrical face of the battery can 26, where a part of the gluing part 24e is brought in close contact with the cylindrical face of the battery can 26, near the bottom of the battery can 26. Subsequently, the paper sheet 24a is wrapped around the battery can 26 for another turn, with its rear side kept in contact with the water-repellent layer 24b of the already wrapped part of the paper sheet 24a, where the remaining part of the gluing part 24e and the gluing part 24f are brought in close contact with the water-repellent layer 24b.

Then, the gluing part 24c extending beyond the open end of the battery can 26 is bent and thereby brought in close contact with the caulked edge portion of the battery can 26 and the peripheral part of the sealing plate 28 next to the caulked edge portion. As a result, the single cell 22 is covered in the outer paper package 24.

While the length $L_2$ of the long side of the paper sheet 24a can be the same as the length of the outer circumference of the battery can 26, it is desirable that the long side of the paper sheet 24a has a length which allows the paper sheet 24a to be wrapped around the battery can 26 for two turns or more. The reason is, when the paper sheet 24a is wrapped around for more than one turn so that a part of the paper sheet 24a may lie over another part of the paper sheet 24a, the outer cylindrical face of the battery can 26 is covered without a break, and thus, water outside can be surely prevented from reaching the battery can 26. In addition, the alkaline electrolyte absorption capacity of the paper sheet 24a can increase.

It is desired that the rear side of the paper sheet 24a, i.e., the side opposite to the water-repellent layer 24b is placed beside the battery can 26. The reason is, if the water-repellent layer 24b is placed beside the battery can 26, the outer paper package 24 can, in some cases, not absorb an alkaline electrolyte leaking from the single cell 22.

In the manufacturing method B, the paper sheet 24a is subjected to the water-repellent treatment before wrapped around the battery can 26. The water-repellent treatment is easier to perform before the paper sheet 24a is wrapped around the battery can 26 than after it is. Thus, the manufacturing method B enables high productivity in manufacturing the alkaline storage battery 20.

As the adhesive which is used when the paper 24a which has been treated with the water-repellent agent is wrapped around the battery can 26, a solventless adhesive which does not contain water as a solvent component, such as a hot melt adhesive, a urethane resin adhesive, an epoxy resin adhesive or the like is desirable. The reason is as follows: For example, in the manufacturing method B, if an adhesive containing water as a solvent component is used in place of a solventless adhesive, water is evaporated when the adhesive is cured. The evaporated water is prevented by the water-repellent layer 24b from escaping to the outside of the outer paper package 24, and confined between the water-repellent layer 24b and the battery can 26. The confined water causes a problem that the battery can 26 rusts due to it. Hence, in the manufacturing method B in which the battery can 26 is covered in the paper sheet 24a with the water-repellent layer 24b, the use of a solventless adhesive is desirable, because it can prevent water, which rusts the battery can 26, from remaining in the outer paper package 24.

When a hot melt adhesive is used, the adhesive is melt by heating and applied to the paper sheet 24a. After the cylindrical part 24A and the end-face part 24B are formed from the paper sheet 24a, the adhesive at the gluing parts 24c, 24d, 24e, 24f is once melt using hot air or the like, and then cooled. Thus, the paper sheet 24a and the single cell 22 are stuck together, and the rear side of the paper sheet 24a and the water-repellent layer 24b are stuck together by the hot melt adhesive.

Next, a power source $A_2$ for an electric screwdriver according to a second embodiment of the invention (hereinafter referred to as "power source $A_2$") will be described below. Here, the same elements as those of the power source $A_1$ will be given the same reference signs, and the explanation thereof will be omitted.

Figure 5:
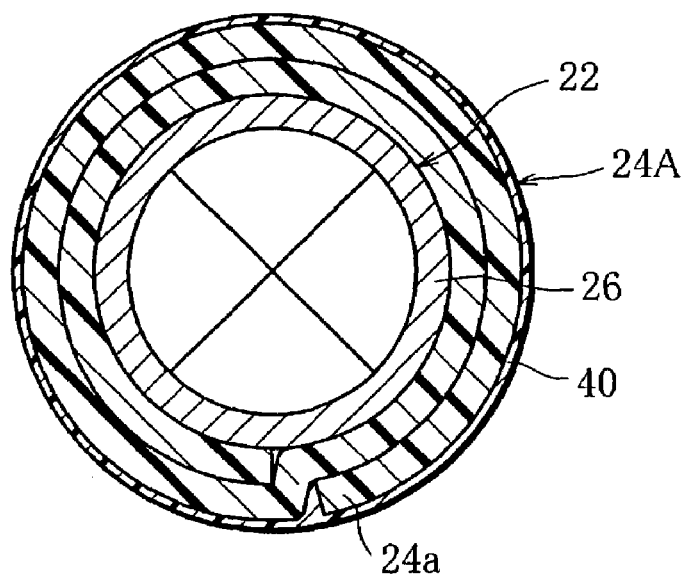
FIG. 5 is a transverse cross-sectional view of an alkaline storage battery included in a power source for a power tool according to a second embodiment of the invention, taken along line III-III of FIG. 2.

In an alkaline storage battery 20 included in the power source $A_2$, the water-repellent layer 24b is not formed in an end-face part 24B of an outer paper package 24, and a paper sheet 24a itself is exposed. Further, as shown in FIG. 5, in a cylindrical part 24A of the outer paper package 24, a water-repellent layer 40 is formed on the paper sheet 24a, only in its part which is exposed when the paper sheet 24a is wrapped around a battery can 26. Thus, in the transverse cross-sectional view, the water-repellent layer 40 looks like a circle.

Figure 6:
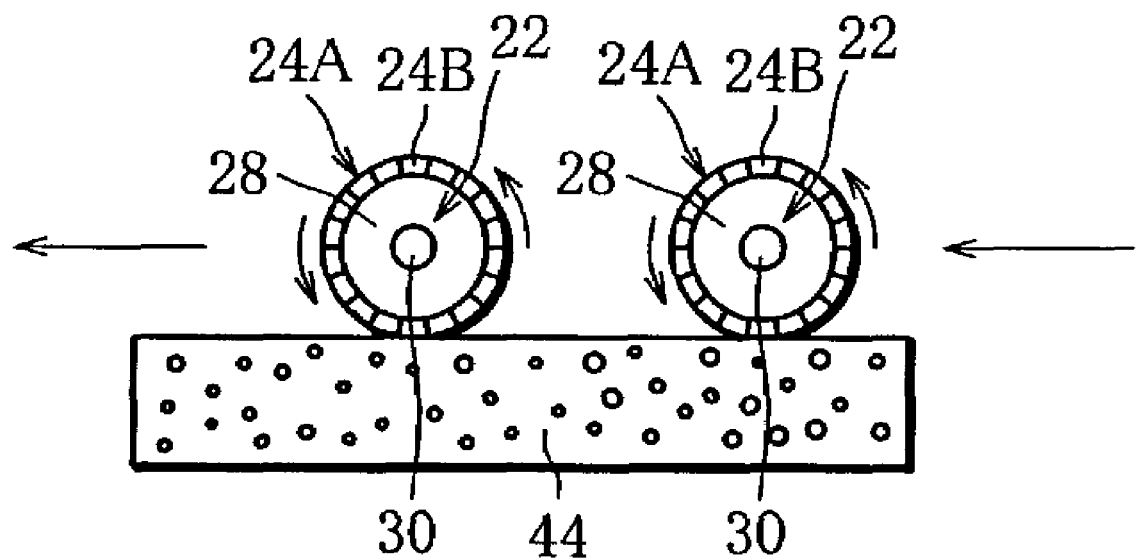
FIG. 6 is an illustration for explaining the process of manufacturing the alkaline storage battery of FIG. 5.

The alkaline storage battery 20 of the power source $A_2$ can be manufactured as follows:

First, a single cell 22 is covered in a paper sheet 24a as in the first embodiment, except that the paper sheet 24a has not undergone water-repellent treatment, and thus does not have a water-repellent layer 24b. Then, as exemplified in FIG. 6, the single cell 22 covered in the paper sheet 24a is rolled across a porous body 44 such as a sponge impregnated with a water-repellent agent, so that the water-repellent agent is applied to the cylindrical face of the paper sheet 24a. Then, by drying the applied water-repellent agent, the alkaline storage battery 20 with a water-repellent layer 40 is obtained.

In this manufacturing method, since the water-repellent layer 40 is formed on the paper sheet 24a after the paper sheet 24a is fixed to the single cell by an adhesive, the adhesive used for fixing the paper sheet 24a may contain water. The reason is, the contained water evaporates before the water-repellent treatment. This manufacturing method is desirable in that the paper sheet 24a can be more easily fixed to the single cell 22 using an adhesive containing water such as an acrylic adhesive, a vinyl acetate adhesive or the like than if it is fixed using a solventless adhesive, particularly a hot melt adhesive.

Also in the alkaline storage battery 20 of the power source $A_2$, if each end-face of the alkaline storage battery 20 is not covered with the buffer member 21, it is desirable to form a water-repellent layer, not only in the cylindrical part 24A but also in the end-face part 24B of the outer paper package 24.

EMBODIMENTS

Embodiments 1, 2, Comparative Example 1

1. Making Batteries

A silicone water-repellent agent (product named "Serestal 40R" made by Ipposha Oil Industries Co., Ltd.) was applied onto one side of electrolytic capacitor paper from which an outer paper package 24 should be made and dried so as to form a water-repellent layer. Then, from this electrolytic capacitor paper, a sheet of 111 mm in long side, 68 mm in short side, and 80 μm in thickness was cut. Then, a solventless adhesive (product named "ASAHITACK A150" made by ASAHI CHEMICAL SYNTHETIC CO., LTD.) was applied onto the cut sheet of electrolytic capacitor paper, at its gluing parts on the side opposite to the side with the water-repellent layer formed on (see FIG. 4). Then, the electrolytic capacitor paper sheet was wrapped around a nickel-hydrogen storage battery of 4/3FA size (φ17 mm) for two turns, and shaped. Then, the electrolytic capacitor paper sheet and the nickel hydrogen storage battery were stuck together by heating the adhesive up to about 100° C. by a dryer and then cooling it. In this way, 100 of nickel-hydrogen storage batteries as embodiment 1, which had the same structure as the alkaline storage battery 20 included in the power source $A_1$, were manufactured.

100 of nickel-hydrogen storage batteries as embodiment 2 were manufactured in the same way as embodiment 1, except that an acrylic adhesive containing water as a solvent component (product named "POLYSOL L-520AA" made by Takachiho Electric Co., Ltd.) was used in place of the solventless adhesive.

Further, for comparison, 100 of nickel-hydrogen storage batteries as comparative example 1 were manufactured in the same way as embodiment 2, except that the outer paper package was made from an electrolytic capacitor paper sheet not treated with a water-repellent agent.

2. Evaluation Test (1) Shelf Test 50 of the nickel-hydrogen storage batteries as embodiment 1, 50 of the nickel-hydrogen storage batteries as embodiment 2 and 50 of the nickel-hydrogen storage batteries as comparative example 1 were left in an ambience of 25° C. in temperature and 50% in humidity, from the time they were just manufactured, for 3 days. Then, whether the battery cans were rusted or not was checked visually, and the number of the rusted battery cans was counted. Table 1 shows the result.

(2) Droplet Test

Regarding 50 of the nickel-hydrogen storage batteries as embodiment 1, 50 of the nickel-hydrogen storage batteries as embodiment 2 and 50 of the nickel-hydrogen storage batteries as comparative example 1, about 15 mL of tap water was dropped on the cylindrical faces of their outer paper packages using a syringe, and the number of the batteries which repelled water was counted by visual observation. Then, the batteries were left in an ambience of 25° C. in temperature and 50% in humidity, for 3 days, without wiping away the dropped tap water on the cylindrical faces of their outer paper packages. Then, whether the battery cans were rusted or not was checked visually, and the number of the rusted battery cans was counted. Table 1 also shows the result of this test.

TABLE 1

| | | | Shelf | Droplet test | |
| --- | --- | --- | --- | --- | --- |
| | Water-repellent layer | Adhesive | Test Number of rusted batteries | Number of batteries which repelled water | Number of rusted batteries |
| Embodiment 1 | Provided | Solventless | 0 | 50 | 0 |
| Embodiment 2 | Provided | Water-containing | 20 | 50 | 20 |
| Comparative Example 1 | None | Water-containing | 0 | 0 | 50 |

As clear from Table 1, in the nickel-hydrogen storage batteries as embodiment 1, since the solventless adhesive was used, water did not remain in the outer paper package. Further, since the drops of dropped water were repelled by the outer paper package, the batteries did not rust in either test.

In the nickel-hydrogen storage batteries as embodiment 2, the drops of dropped water were repelled by the outer paper package and prevented from penetrating the outer paper package. However, in the nickel-hydrogen storage batteries as embodiment 2, since the outer paper package having water-repellency was stuck by the water-containing adhesive, water remained between the water-repellent layer and the battery can. Thus, twenty of the battery can rusted in both tests.

In the nickel-hydrogen storage batteries as comparative example 1, the outer paper package did not have water-repellency. Thus, in the shelf test, water contained in the adhesive escaped from the outer paper package and the battery can did not rust. However, in the droplet test, water penetrated the outer paper package, and all the 50 battery cans rusted.

Embodiments 3, 4, Comparative Example 2

3. Making Batteries

As a material for an outer paper package 24, an electrolytic capacitor paper sheet of 111 mm in long side, 68 mm in short side, and 80 µm in thickness was prepared. Then, as shown in FIG. 4, an acrylic adhesive was applied onto one side of the electrolytic capacitor paper sheet, at its gluing parts. Then, the electrolytic capacitor paper sheet was wrapped around a nickel-hydrogen storage battery of 4/3FA size ($\phi$17 mm) for two turns, and shaped. Then, the adhesive was dried by heating.

Then, a silicone water-repellent agent was applied onto the cylindrical face of the electrolytic capacitor paper sheet which covered the battery, and dried. In this way, 100 of nickel-hydrogen storage batteries as embodiment 3, which had the same structure as the alkaline storage battery 20 included in the power source $A_2$, were manufactured.

100 of nickel-hydrogen storage batteries as embodiment 4 were manufactured in the same way as embodiment 3, except that a polypropylene film was stuck to the cylindrical face of the electrolytic capacitor paper sheet which covered the battery in place of applying the silicone water-repellent agent.

Further, for comparison, 100 of nickel-hydrogen storage batteries as comparative example 2 were manufactured in the same way as embodiment 3, except that water-repellent treatment was not performed.

4. Evaluation Test (1) Droplet Test

Regarding 50 of the nickel-hydrogen storage batteries as embodiment 3, 50 of the nickel-hydrogen storage batteries as embodiment 4 and 50 of the nickel-hydrogen storage batteries as comparative example 2, about 16 mL of tap water was dropped on the cylindrical faces of their outer paper packages using a syringe, and the number of the batteries which repelled water was counted by visual observation. Then, the batteries were left in an ambience of 25° C. in temperature and 50% in humidity, for 3 days, without wiping away the dropped tap water on the cylindrical faces of their outer paper packages. Then, whether the battery cans were rusted or not was checked visually, and the number of the rusted battery cans was counted. Table 2 shows the result of the test.

(2) High-humidity Exposure Test

The remaining 50 nickel-hydrogen storage batteries as embodiment 3, the remaining 50 nickel-hydrogen storage batteries as embodiment 4 and the remaining 50 nickel-hydrogen storage batteries as comparative example 2 were left in a high-humidity atmosphere of 60° C. in temperature and 93% in humidity, for 72 hours. Then, whether the battery cans were rusted or not was checked visually. Also, about 16 mL of tap water was dropped on the cylindrical faces of their outer paper packages using a syringe, and the number of the batteries which repelled water was counted by visual observation. Table 2 also shows the result of this test.

TABLE 2

|  | Water-repellent layer | Droplet test | | High-humidity exposure test | |
|---|---|---|---|---|---|
|  |  | Number of batteries which repelled water | Number of rusted batteries | Number of batteries which repelled water | Number of rusted batteries |
| Embodiment 3 | Silicone water-repellent agent | 50 | 0 | 50 | 0 |
| Embodiment 4 | PP film | 50 | 0 | 50 | 50 |
| Comparative example 2 | None | 0 | 50 | 0 | 50 |

As clear from Table 2, regarding the batteries as embodiment 3, the surface of the outer paper package showed good water-repellency in both the droplet test and the high-humidity exposure test. Further, rusting of battery cans were not observed in either test, at all.

Regarding the batteries as embodiment 4, since the surface of the outer paper package had water-repellency, rusting was not observed in the droplet test. However, in the high-humidity exposure test, in all the batteries, the battery cans rusted although the surfaces of their outer paper packages had water-repellency.

The reasons for these results are supposed to be as follows: In the high-humidity atmosphere, the water which penetrates the electrolytic capacitance paper sheet from the part other than the part to which the polypropylene film is stuck spreads in the entire electrolytic capacitance paper sheet with time. Thus, also that part of the electrolytic capacitance paper sheet which is covered with the polypropylene film comes to contain water. Since the polypropylene film has a strong water-repellency, the water which comes under the polypropylene film is hindered from escaping from the outer paper package to the outside. As a result, the water remains inside and causes the battery can to rust. In contrast, in the batteries as embodiment 3, the water-repellent layer made from a silicone water-repellent agent is provided. This water-repellent layer repels drops of water having a certain degree of size, while it has a certain degree of permeability to gaseous water such as water vapor. Thus, even if water penetrates the electrolytic capacitance paper sheet from the part which is not treated with a water-repellent, water is not confined in the outer paper package because of the permeability of the water-repellent layer, and thus the battery can is prevented from rusting.

Regarding the nickel-hydrogen storage batteries as comparative example 2, the outer paper package did not have water-repellency at all. Hence, in both the droplet test and the high-humidity exposure test, water was repelled by the surface of the outer paper package only to a very small degree, and penetrated the outer paper package. Thus, regarding all the batteries, rusting was observed.

The present invention is not limited to the embodiments described above. Various modifications can be made thereto. The capacity, shape and size of the single cell are not limited to any particular ones. Also, the lengths of the short side and long side of the paper sheet are not limited to any particular ones.

What is claimed is:

1. A method of manufacturing a battery, comprising the steps of:

partially applying an adhesive on an inner surface of a paper sheet having an outer surface;

covering a circumferential surface of a single cell with said paper sheet and bonding said single cell and the inner surface through the adhesive;

drying the adhesive;

applying a water-repellent agent on the outer surface of said paper sheet so that said paper sheet will not be impregnated with the water-repellant agent along its entire thickness and said paper sheet will have a water-absorbing layer left at the inner surface after said drying step; and drying the water-repellant agent applied on the outer surface of said paper sheet, wherein said applying is by rolling said single cell covered with said paper sheet on a porous material containing the water-repellant agent.

2. The method of manufacturing a battery according to claim 1, wherein said water-repellent agent is a silicone water-repellent agent.

3. The method of manufacturing a battery according to claim 1, wherein said adhesive contains water as a solvent before said drying step.

4. The method of manufacturing a battery according to claim 1, wherein said single cell is a nickel-hydrogen storage cell.

* * * * *